United States Patent
Chatterjee et al.

(10) Patent No.: US 8,141,066 B2
(45) Date of Patent: Mar. 20, 2012

(54) CROSS-PLATFORM ARCHITECTURE FOR REPLICATING PROFILING SCHEME IN A COMPUTER SYSTEM

(75) Inventors: Arijit Chatterjee, Karnataka (IN); Rajesh Kumar Chaurasia, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1130 days.

(21) Appl. No.: 12/000,645

(22) Filed: Dec. 14, 2007

(65) Prior Publication Data

US 2008/0172661 A1    Jul. 17, 2008

(30) Foreign Application Priority Data

Jan. 12, 2007    (IN) ........................................ 79/2007

(51) Int. Cl.
G06F 9/45    (2006.01)

(52) U.S. Cl. ........ 717/158; 717/130; 717/131; 717/136; 717/153

(58) Field of Classification Search ........................ None
See application file for complete search history.

(56) References Cited

U.S. PATENT DOCUMENTS

| | | | | |
|---|---|---|---|---|
| 5,764,962 A | * | 6/1998 | Buzbee | 703/23 |
| 5,872,978 A | * | 2/1999 | Hoskins | 717/158 |
| 6,189,141 B1 | * | 2/2001 | Benitez et al. | 717/153 |
| 6,219,825 B1 | * | 4/2001 | Burch et al. | 717/158 |
| 6,223,339 B1 | * | 4/2001 | Shah et al. | 717/158 |
| 6,247,172 B1 | * | 6/2001 | Dunn et al. | 717/141 |
| 6,289,505 B1 | * | 9/2001 | Goebel | 717/153 |
| 6,327,704 B1 | * | 12/2001 | Mattson et al. | 717/153 |
| 6,631,518 B1 | * | 10/2003 | Bortnikov et al. | 717/158 |
| 6,751,583 B1 | * | 6/2004 | Clarke et al. | 703/17 |
| 6,754,890 B1 | * | 6/2004 | Berry et al. | 717/128 |
| 6,826,748 B1 | | 11/2004 | Hohensee et al. | |
| 6,871,173 B1 | | 3/2005 | Brauch | |
| 7,237,234 B2 | * | 6/2007 | Granston et al. | 717/151 |
| 7,293,260 B1 | * | 11/2007 | Dmitriev | 717/130 |
| 7,296,271 B1 | * | 11/2007 | Chalmer et al. | 718/108 |
| 7,401,324 B1 | * | 7/2008 | Dmitriev | 717/130 |
| 7,770,163 B2 | * | 8/2010 | Stoodley et al. | 717/158 |
| 7,849,450 B1 | * | 12/2010 | Rydh et al. | 717/131 |
| 7,926,043 B2 | * | 4/2011 | Vaswani et al. | 717/130 |
| 2004/0194077 A1 | * | 9/2004 | Bharadwaj et al. | 717/158 |
| 2005/0183090 A1 | * | 8/2005 | Hunt | 719/310 |
| 2007/0174750 A1 | * | 7/2007 | Borin | 714/732 |
| 2009/0307430 A1 | * | 12/2009 | Bruening et al. | 711/119 |

OTHER PUBLICATIONS

PowerScope: a tool for profiling the energy usage of mobile applications, author: Flinn J et al, source: IEEE, dated: Feb. 25, 1999.*

* cited by examiner

*Primary Examiner* — Chameli Das (57) ABSTRACT

The method, an apparatus, and/or a system of cross-platform architecture for replicating profiling scheme in a computer system are disclosed. In one embodiment, a method for forming profiling information of one computer platform in another computer platform includes generating instrumented code by a code instrumenter using a target platform code. The method further includes generating the profile information that the source platform profiling tools can decipher and utilize using the instrumented code, and generating a profile report by analyzing the generated profile information using the source platform profiling tools in a dynamic binary translator that can be used by the dynamic binary translator (DBT) to generate target platform code. In addition, the method may include translating source platform object code into the target platform code using the DBT.

18 Claims, 4 Drawing Sheets

CROSS-PLATFORM ARCHITECTURE FOR REPLICATING PROFILING SCHEME IN A COMPUTER SYSTEM

This application claims priority from Indian patent application 79/CHE/2007, filed on Jan. 12, 2007. The entire content of the aforementioned application is incorporated herein by reference.

BACKGROUND

As processors evolve and/or new processor families/architectures emerge, existing software programs may not be efficiently executable/run on these new processors. These problems arise due to lack of binary compatibility between new processor families/architectures and/or older processors. This is because computers may naturally execute programs coded in their own native instruction set architecture (ISA), the ISA of the architecture family for which the computer is a member. In other words, as processors evolve, their instruction sets may change and/or prevent existing software programs from being executed on the new processors unless some action is taken. Authors of software programs may either rewrite and/or recompile their software programs and/or processor manufacturers may provide instructions to replicate previous instructions. Both of these solutions may have their drawbacks as either it may require users to purchase a new version to use with a new machine which may cause the existing users to incur additional costs of redeployment and/or re-certification, or can require including instructions into newer processors to replicate previous instructions. This may limit advances that may be made to the new processor due to cost and limitations of the legacy instructions and architecture. Therefore, transitioning to a new architecture may never be easy. Users may want to keep running their favorite applications as they normally would, without stopping to adapt them to a different platform. For some legacy applications the problem may be more severe. Without all the source code, it may be impossible to recompile the applications to a new platform. Thus, porting these legacy applications may require a method for forming profiling information of one computer platform in another computer platform which can result in not being just slow but may be impossible too.

Dynamic binary translators (DBTs) may provide a possible solution to these issues. A DBT may dynamically translate all or a portion of source program (e.g., a program understandable by one processor family) into an associated target program (e.g., a program understandable by another processor family) on a target machine during execution. This translation may allow a user to execute programs that the user previously may have used on an older machine, on a new machine without having to create a new version of the software, and/or may allow the processor to abandon some or all legacy instructions and/or architecture features. Basically, DBTs may translate the binary code from one instruction set to another without the need for high-level source code.

However, using DBTs to translate the binary code from one instruction set to another may result in performance issues due to difference in system behavior, such as cache latency, spin lock performance and the like on the new platform. Generally, applications have performance monitoring tools that may detect these problem areas, but such tools may be rarely supported on the new platform. This generally results in monitoring and/or measuring the emulator performance and not the emulated application due to non-availability of instrumented code in the released production version of the application software. This may result in masking the reasons for the sub-optimal performance of the emulated applications. Further, non-native execution may be slower than native execution as a non-native program may incur translation and/or book-keeping overheads.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

The method, an apparatus, and/or a system of cross-platform architecture for replicating profiling scheme in a computer system are disclosed. In the following description, for purposes of explanation, numerous specific details are set forth in order to provide a thorough understanding of the various embodiments. It will be evident, however, to one skilled in the art that the various embodiments may be practiced without these specific details.

Figure 1:
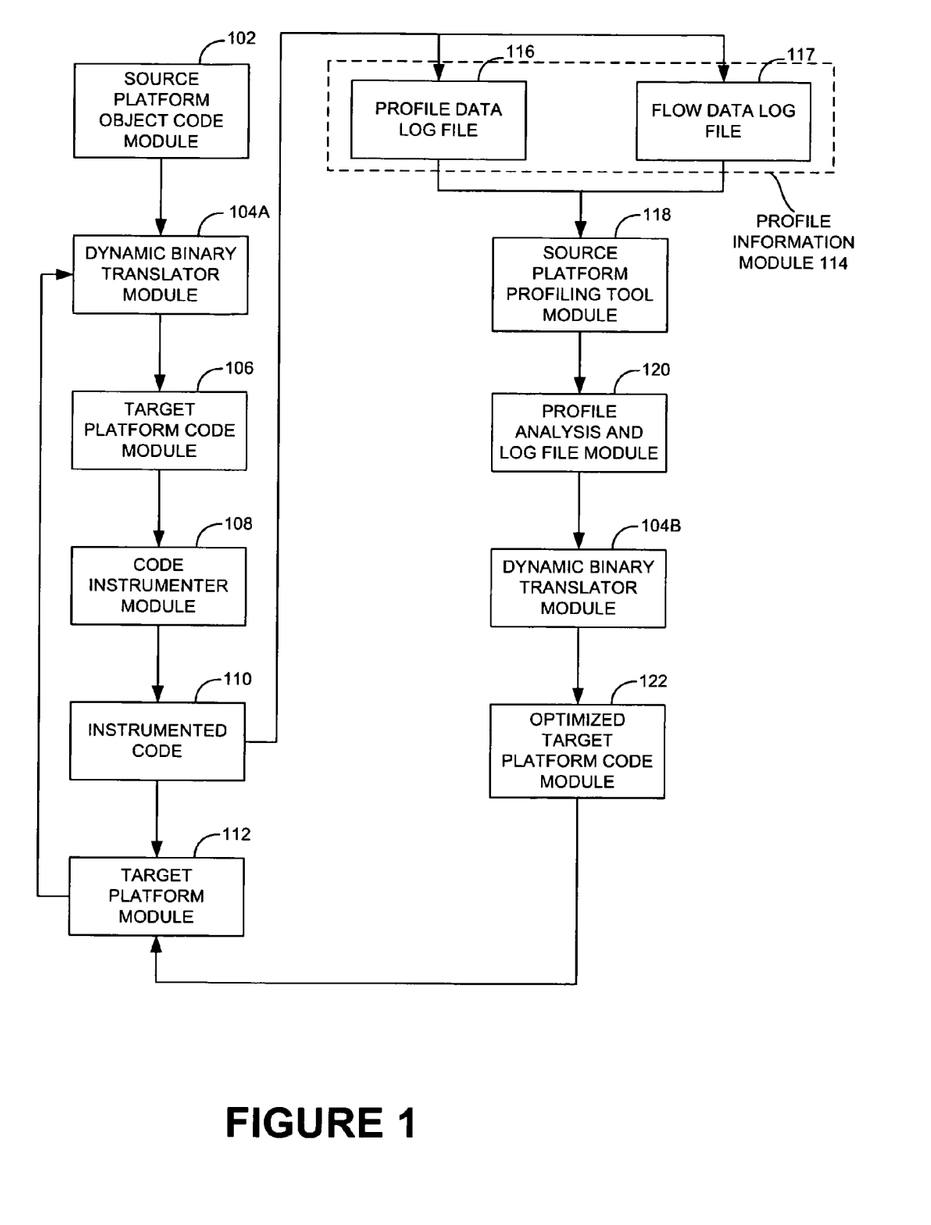
FIG. 1 is a block diagram of cross-platform architecture for replicating profiling information in a computing system, according to one embodiment.

In one embodiment, a method for forming profiling information of one computer platform (e.g., the set of hardware components that may make up the computer itself, that the software is written to target) in another computer platform includes generating instrumented code (e.g., instrumented code 110 of FIG. 1) by a code instrumenter (e.g., a machine which may produce instructions that can run on the target architecture to count data such as instruction pointer, memory accesses, direct and indirect branches, system performance data, etc) using a target platform code (e.g., a code which is translated to execute a software program on a target machine), generating the profile information (e.g., the profile data, flow path data, etc) that the source platform profiling tools (e.g., the source platform profiling tools module 118 of FIG. 1) can decipher and/or utilize using the instrumented code (e.g., instrumented code 110 of FIG. 1) and generating a profile report by analyzing the generated profile information using the source platform profiling tools (e.g., the source platform profiling tools module 118 of FIG. 1) in a dynamic binary translator (e.g., the dynamic binary translator module 104A-104B of FIG. 1) that can be used by a dynamic binary translator (DBT) (e.g., the dynamic binary translator module 104A-104B of FIG. 1) to generate target platform code (e.g., the target platform code module 106 of FIG. 1). In these embodiments, the code instrumenter is an integral part of the DBT even though it has a separate functionality.

In another embodiment, an article includes a storage medium having instructions, that when executed by a computing platform, results in execution of a method for replicating profiling information of one computing platform to another computing platform that includes generating instrumented code (e.g., instrumented code 110 of FIG. 1) by a code instrumenter (e.g., code instrumenter module 108 of FIG. 1) using a target platform code (e.g., the target platform code module 106 of FIG. 1), generating the profile information that source platform profiling tools (e.g., the source platform profiling tools module 118 of FIG. 1) can decipher and/or utilize using the instrumented code (e.g., instrumented code 110 of FIG. 1) and generating a profile report by analyzing the generated profile information (e.g., profile log data, flow path data, etc.) using the source platform profiling tools (e.g., the source platform profiling tools module 118 of FIG. 1) in a dynamic binary translator (e.g., the dynamic binary translator module 104A-104B of FIG. 1) that can be used by the dynamic binary translator (DBT) (e.g., the dynamic binary translator module 104A-104B of FIG. 1) to generate target platform code (e.g., the target platform code module 106 of FIG. 1).

In yet another embodiment, a computer system includes a processing unit and a memory (e.g., a volatile memory, a non-volatile memory, etc.) coupled to the processor, the memory (e.g., volatile memory, non-volatile memory) having stored therein code for creating memory page classification, the code causes the processor to perform a method including generating instrumented code (e.g., instrumented code 110 of FIG. 1) by a code instrumenter (e.g., the code instrumenter module 108 of FIG. 1) using a target platform code (e.g., the target platform code module 106 of FIG. 1), generating the profile information that source platform profiling tools (e.g., the source platform profiling tools module 118 of FIG. 1) can decipher and/or utilize using the instrumented code (e.g., instrumented code 110 of FIG. 1), and generating a profile report by analyzing the generated profile information (e.g., profile data, flow path data, etc.) using the source platform profiling tools (e.g., the source platform profiling tools module 118 of FIG. 1) in a dynamic binary translator (e.g., the dynamic binary translator module 104A-104B of FIG. 1) that can be used by the dynamic binary translator (DBT) (e.g., the dynamic binary translator module 104A-104B of FIG. 1) to generate target platform code (e.g., the target platform code module 106 of FIG. 1).

FIG. 1 is a block diagram of cross-platform architecture for replicating profiling information in a computing system, according to one embodiment. Particularly FIG. 1 illustrates a source platform object code module 102, a dynamic binary translator module 104A, a target platform code module 106, a code instrumenter module 108, a instrumented code 110, a target platform module 112, a profile information module 114, a profile data log file 116, a flow data log file 117, a source platform profiling tools module 118, a profile analysis and log file 120, a dynamic binary translator module 104B, an optimized target platform code module 122, according to one embodiment.

The source platform object code module 102 may contain the set of source platform instructions in the form of code that may be used to execute a software application on the source platform. The dynamic binary translator module 104A may translate the binary code from a set of source platform instructions (e.g., the source platform object code module 102 of FIG. 1) to a set of target platform instructions (e.g., the target platform code module 106 of FIG. 1) to execute a software application on a target machine (e.g., the target platform module 112 of FIG. 1). The target platform code module 106 may be the translated code for executing a software application on the target platform module 112.

The code instrumenter module 108 may be a component that may be invoked during the sampling run to generate the instrumented code 110. The instrumented code 110 may be associated with producing logs in the form of files that may be formatted in a form understood by the source platform profiling tools (e.g., the source platform profiling tools module 118 of FIG. 1). The target platform module 112 may be a frame work that may include computer's architecture, operating system, programming language and their runtime libraries and/or may use translated target platform code while executing the software application.

The profile information module 114 may hold information associated with the profile data and/or flow path data. The profile information module 114 may contain the profile data log file 116 and flow data log file 117. The profile data log file 116 may include the information associated with the profile file generated using the instrumented code 110. Also, the flow data log file 117 may include the information associated with the flow path data generated using the instrumented code 110. The source platform profiling tools module 118 may be associated with generating performance report with flat profiles, call graphs, etc. to generate the optimized performance code (e.g., using the optimized target platform code module 122).

The profile analysis and log file 120 may analyze the performance report generated using the profile information (e.g., the flow path data, profile data, etc.). In addition, the dynamic binary translator module 104B may also use the dynamically obtained kernel performance data to generate the significantly higher performance target platform code (e.g., using the optimized target platform code module 122 of FIG. 1). The optimized target platform code module 122 may be associated with better quality translated code that may be free from the performance problem areas such as cache latency, spin lock performance, etc while executing a software application on the target platform module 112.

In an example embodiment illustrated in FIG. 1, the source platform object code module 102 may represent an intermediate code that may be generated by the compiler after a source code is processed from a source platform. The dynamic binary translator module 104A may translate (e.g., may generate a code native to a target platform module 112) the set of source platform instructions into a set of target platform based on the decoded information. In example embodiment illustrated in FIG. 1, the target platform code module 106 may contain the translated code that may be used to run a software application on the target platform module 112.

In example embodiment illustrated in FIG. 1, the code instrumenter module 108 may generate the instrumented code 110 using the target platform code module 106. The instrumented code 110 may generate a profile information (e.g., the profile data, flow path data, etc.) that source platform profiling tools (e.g., the source platform profiling tools module 118) may decipher and/or utilize according to an example embodiment illustrated in FIG. 1. The target platform module 112 may be a framework that may use the translated target platform code generated by the target platform code module 106 to execute a software application. In the example embodiment illustrated in FIG. 1, the profile information module 114 may contain the profile log data and/or the flow path data generated by using the instrumented code 110. The profile data log file 116 may contain profile log data generated using the instrumented code 110 which may include, but not limited to, profile data generated by using the instrumented code 110 and kernel profile generated using the kernel emulation module of the dynamic binary translator module 104A.

In example embodiment illustrated in FIG. 1, the flow data log file 117 may include flow path data that may be generated using instrumented code 110. The source platform profiling tools module 118 may generate the profile report by analyzing the profile information (e.g., the profile log data, flow path data, etc) generated using the instrumented code 110.

In the example embodiment, the dynamic binary translator module may generate the improved performance target platform code using the profile data generated by the profile analysis and log file 120. The optimized target platform code module 122 may be improved performance target platform code that may be used by the target platform module 112 to execute the application program as illustrated in example embodiment of FIG. 1.

For example, the instrumented code 110 may be generated by the code instrumenter using the target platform code. In addition, the profile information (e.g., the profile information may include profile data and/or flow path data) that the source platform profiling tools (e.g., the source platform profiling tools module 118 of FIG. 1) can decipher and utilize may be generated using the instrumented code 110 (e.g., the instrumented code 110 may include inserting instrumentation into each set of instructions in the target platform code that require generating profiling information similar to source platform code. For example, the set of instructions in the target platform code includes loop, branch, and the like. Also, the profile report may be generated by analyzing the generated profile information using the source platform profiling tools in the dynamic binary translator (e.g., the dynamic binary translator 104A-B of FIG. 1) that can be used by the dynamic binary translator (DBT) (e.g., the dynamic binary translator 104A-B of FIG. 1) to generate target platform code.

In addition, the source platform object code (e.g., the source platform object code module 102 of FIG. 1) may be translated into the target platform code (e.g., the target platform code module 106 of FIG. 1) using the DBT (e.g., the dynamic binary translator 104A-B of FIG. 1). Also, the target platform code (e.g., the target platform code module 106 of FIG. 1) as a function of the generated profile report may be generated to improve target platform code performance. Furthermore, an interface to operating system that may be substantially similar to a source operating system may be provided by utilizing DBTs' operating system emulation services upon encountering code associated with the source platform object code (e.g., the source platform object code module 102 of FIG. 1).

Moreover, the kernel performance data may be dynamically obtained during a sampling run of the instrumented code (e.g., the instrumented code 110 of FIG. 1) by the DBT (e.g., the dynamic binary translator 104A-B of FIG. 1). Also, the target platform code (e.g., the target platform code module 106 of FIG. 1) may be generated by the DBT (e.g., the dynamic binary translator 104A-B of FIG. 1), based on the dynamically obtained kernel performance data.

In one embodiment, the source platform profiling tools module 118 may be in a dynamic binary translator module 104A-104B. In an alternate embodiment, the profile information (e.g., the profile data, flow path data, etc.) may be generated through the target platform module 112.

Figure 2:
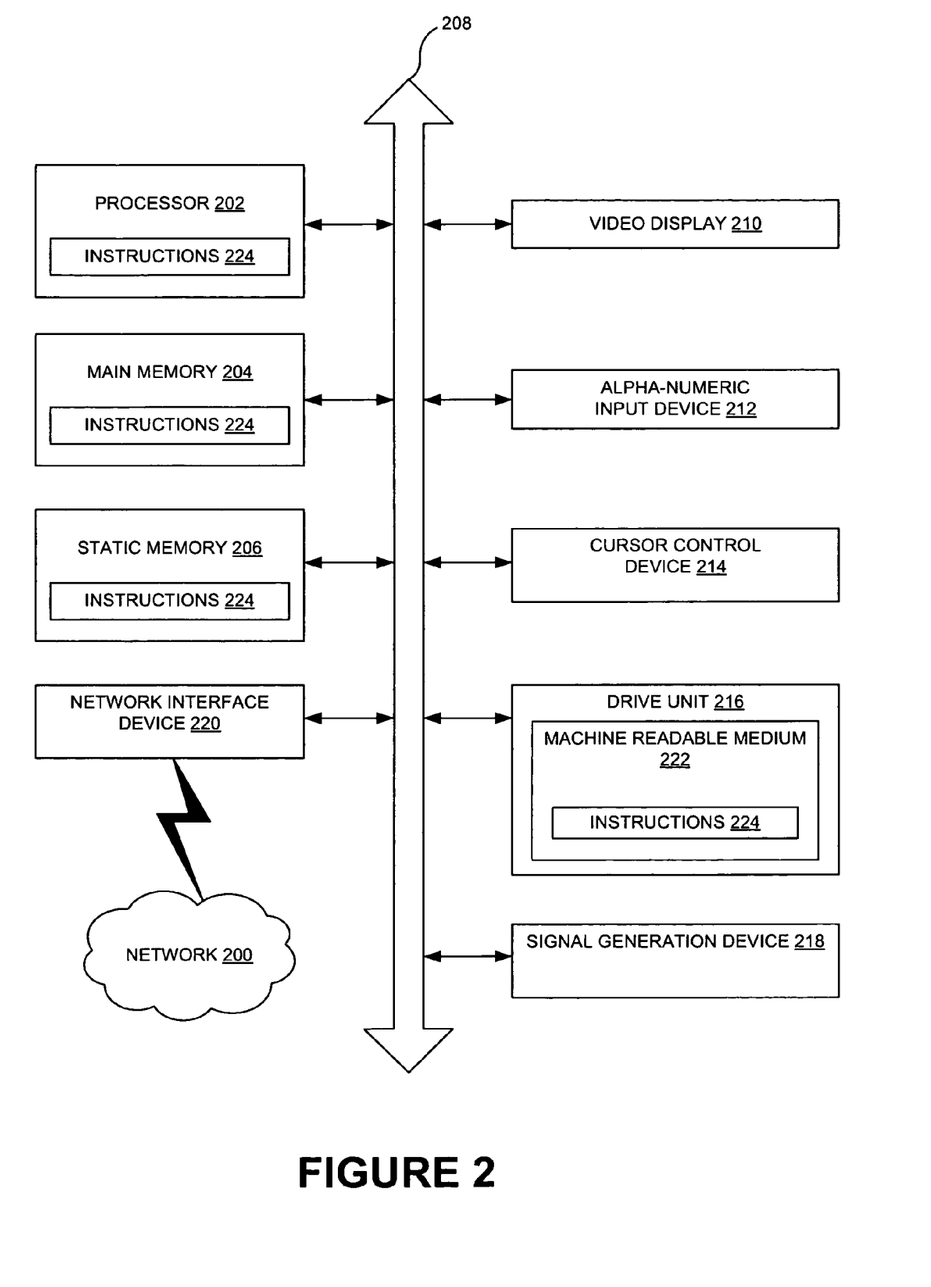
FIG. 2 is a diagrammatic system view of a data processing system in which any of the embodiments disclosed herein may be performed, according to one embodiment.

FIG. 2 is a diagrammatic system view 200 of a data processing system in which any of the embodiments disclosed herein may be performed, according to one embodiment. Particularly, the diagrammatic system view of FIG. 2 illustrates a processor 202, a main memory 204, a static memory 206, a bus 208, a video display 210, an alpha-numeric input device 212, a cursor control device 214, a drive unit 216, a signal generation device 218, a network interface device 220, a machine readable medium 222, instructions 224, and a network 226, according to one embodiment.

The diagrammatic system view 200 may indicate a personal computer and/or a data processing system in which one or more operations disclosed herein are performed. The processor 202 may be microprocessor, a state machine, an application specific integrated circuit, a field programmable gate array, etc. (e.g., Intel® Pentium® processor). The main memory 204 may be a dynamic random access memory and/or a primary memory of a computer system. The static memory 206 may be a hard drive, a flash drive, and/or other memory information associated with the data processing system.

The bus 208 may be an interconnection between various circuits and/or structures of the data processing system. The video display 210 may provide graphical representation of information on the data processing system. The alpha-numeric input device 212 may be a keypad, keyboard and/or any other input device of text (e.g., a special device to aid the physically handicapped). The cursor control device 214 may be a pointing device such as a mouse. The drive unit 216 may be a hard drive, a storage system, and/or other longer term storage subsystem.

The signal generation device 218 may be a bios and/or a functional operating system of the data processing system. The network interface device 220 may perform interface functions (e.g., code conversion, protocol conversion, and buffering) required for communications to and from a network between a number of independent devices (e.g., of varying protocols). The machine readable medium 222 may provide instructions on which any of the methods disclosed herein may be performed. The instructions 224 may provide source code and/or data code to the processor 202 to enable any one/or more operations disclosed herein.

For example, a storage medium having instructions, that when executed by a computing platform executes a method for replicating profiling information (e.g., the profile information may include profile data and flow path data) of one computing platform to another computing platform that includes generating instrumented code (e.g., the instrumented code may include inserting instrumentation into each loop and branch in the target platform code to generate the profile information) by a code instrumenter (e.g., the code instrumenter module 108 of FIG. 1) using a target platform code (e.g., the target platform code module 106 of FIG. 1).

Furthermore, the storage medium includes instructions to generate the profile information that the source platform profiling tools (e.g., the source platform profiling tools module 118 of FIG. 1) can decipher and utilize using the instrumented code (e.g., the instrumented code 110 of FIG. 1). In addition, the storage medium having instructions to generate a profile report by analyzing the generated profile information uses the source platform profiling tools (e.g., the source platform profiling tools module 118 of FIG. 1) in a dynamic binary translator (e.g., the dynamic binary translator module 104A-104B of FIG. 1) that may be used by the dynamic binary translator (DBT) (e.g., the dynamic binary translator module 104A-B of FIG. 1) to generate target platform code (e.g., the target platform code module 106 of FIG. 1).

In addition, the storage medium may have instructions to translate source platform object code (e.g., the source platform object code module 102 of FIG. 1) into the target platform code (e.g., the target platform code module 106 of FIG. 1) using the DBT (e.g., the dynamic binary translator module 104A-B of FIG. 1). Also, the storage medium may have instructions to generate the target platform code (e.g., the target platform code module 106 of FIG. 1) as a function of the generated profile report to improve target platform code performance.

Additionally, the storage medium may have instructions to provide an interface to operating system that may be substantially similar to a source operating system by utilizing DBTs' operating system emulation services upon encountering code associated with the source platform object code (e.g., the source platform object code module 102 of FIG. 1). Furthermore, the storage medium may have instructions to dynamically obtain kernel performance data during a sampling run of the instrumented code (e.g., the instrumented code 110 of FIG. 1) by a DBT (e.g., the dynamic binary translator module 104A-B of FIG. 1).

In addition, the storage medium may have instructions to generate target platform code (e.g., the target platform code module of FIG. 1) by the DBT (e.g., the dynamic binary translator module 104A-B of FIG. 1) based on the dynamically obtained kernel performance and other profile data/logs.

Furthermore, a computer system includes a processing unit and a memory coupled to the processor. The memory has code stored therein for creating memory page classification. The code causes the processor to generate instrumented code (e.g., the instrumented code (e.g., the instrumented code 110 of FIG. 1) may include inserting instrumentation into each loop and branch in the target platform code (e.g., the target platform code module 106 of FIG. 1) to generate the profile information) by a code instrumenter (e.g., the code instrumenter module 108 of FIG. 1) using a target platform code (e.g., the target platform code module 106 of FIG. 1). The code also causes the processor to generate the profile information (e.g., the profile information comprises profile data and flow path data) that the source platform profiling tools (e.g., the source platform profiling tools module 118 of FIG. 1) can decipher and utilize using the instrumented code (e.g., the instrumented code 110 of FIG. 1).

The code further causes the processor to generate a profile report by analyzing the generated profile information using the source platform profiling tools (e.g., the source platform profiling tools module 118 of FIG. 1) in a dynamic binary translator (e.g., the dynamic binary translator module 104A-B of FIG. 1) that can be used by the dynamic binary translator (DBT) (e.g., the dynamic binary translator module 104A-B of FIG. 1) to generate target platform code (e.g., the target platform code module 106 of FIG. 1).

The code may cause the processor to generate source platform object code (e.g., the source platform object code module 102 of FIG. 1) into the target platform code (e.g., the target platform code module 106 of FIG. 1) using the DBT (e.g., the dynamic binary translator module 104A-B of FIG. 1). The code may further cause the processor to generate the target platform code (e.g., the target platform code module 106 of FIG. 1) as a function of the generated profile report to improve target platform code performance.

Furthermore, the code may cause the processor to provide an interface to operating system that may be substantially similar to a source operating system by utilizing DBTs' operating system emulation services upon encountering code associated with the source platform object code (e.g., the source platform object code module 102 of FIG. 1). The code may cause the processor to dynamically obtain kernel performance data during a sampling run of the instrumented code (e.g., the instrumented code 110 of FIG. 1) by a DBT. The code may cause the processor to generate target platform code (e.g., the target platform code module 106 of FIG. 1) by the DBT (e.g., the dynamic binary translator module 104A-B of FIG. 1) based on the dynamically obtained kernel performance data in addition to other profile data/logs generated by the source platform profiling tools.

Figure 3:
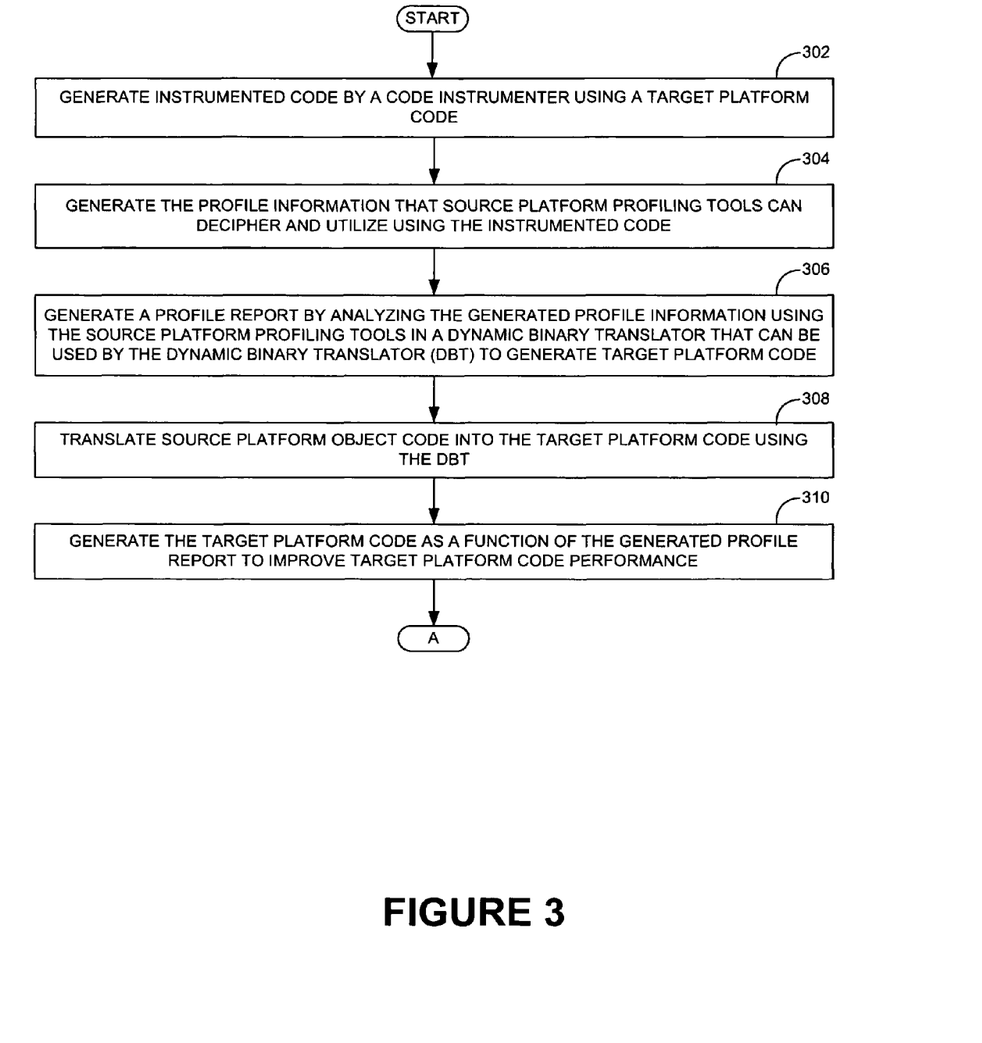
FIG. 3 is a process flow of replicating profiling information in a computer system, according to one embodiment.

FIG. 3 is a process flow of replicating profiling information in a computer system, according to one embodiment. In operation 302, instrumented code (e.g., the instrumented code 110 of FIG. 1) may be generated by a code instrumenter (e.g., the code instrumenter module 108 of FIG. 1) using a target platform code (e.g., the target platform code module 106 of FIG. 1). In operation 304, the profile information (e.g., the profile log data, flow path data, etc.) that the source platform profiling tools (e.g., the source platform profiling tools module 118 of FIG. 1) can decipher and utilize may be generated using the instrumented code (e.g., the instrumented code 110 of FIG. 1).

In operation 306, a profile report may be generated by analyzing the generated profile information (e.g., the profile data, the flow path data, etc.) using the source platform profiling tools (e.g., the source platform profiling tools module 118 of FIG. 1) in a dynamic binary translator (e.g., the dynamic binary translator module 104A-B of FIG. 1) that can be used by the dynamic binary translator (e.g., the dynamic binary translator module 104A-104B of FIG. 1) to generate the target platform code (e.g., the target platform code module 106 of FIG. 1). In operation 308, a source platform object code (e.g., the source platform object code module 102 of FIG. 1) may be translated into a target platform code (e.g., the target platform code module 106 of FIG. 1) using the DBT (e.g., the dynamic binary translator module 104A-104B of FIG. 1). In operation 310, the target platform code (e.g., the target platform code module 106 of FIG. 1) may be generated as a function of the generated profile report to improve target platform code performance.

Figure 4:
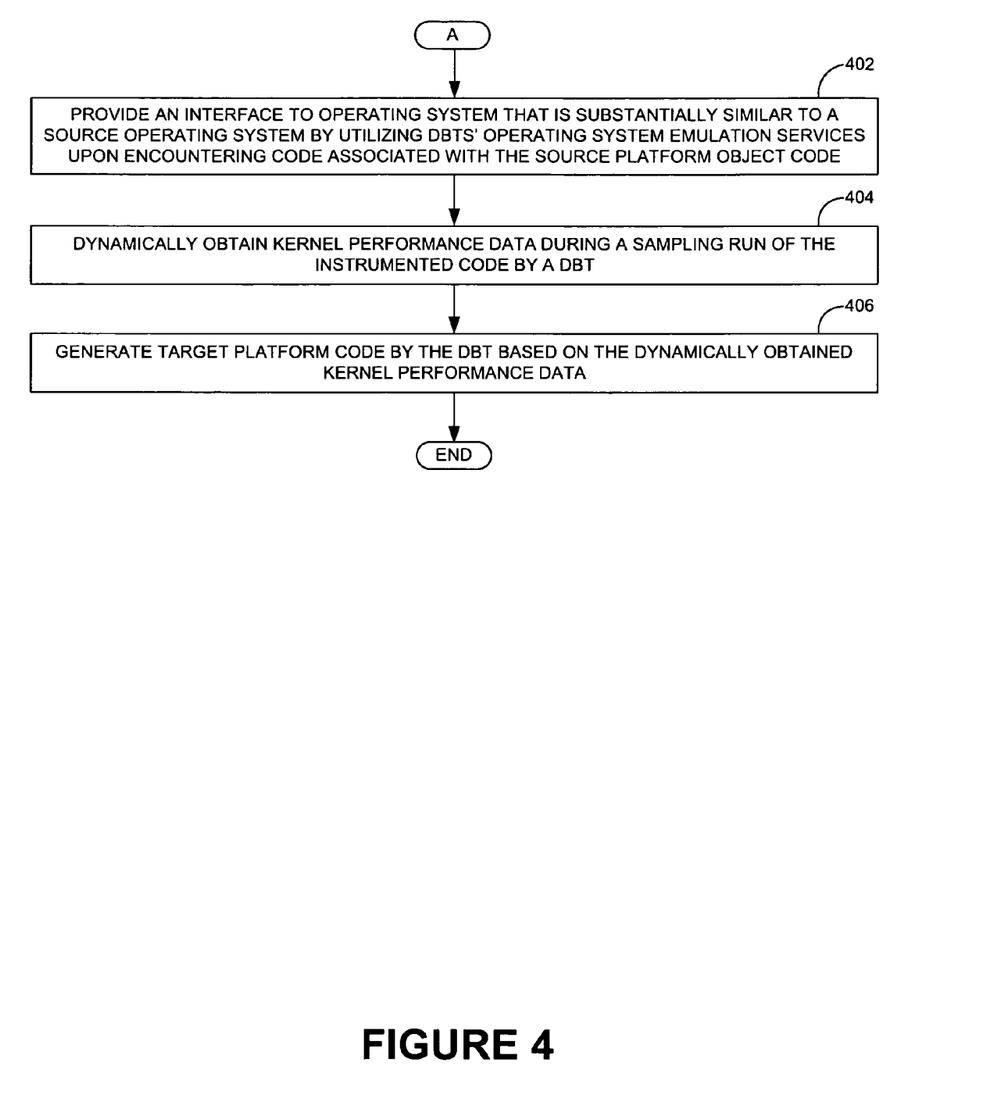
FIG. 4 is a continuation of process flow of FIG. 3 showing additional processes, according to one embodiment.

FIG. 4 is a continuation of process flow of FIG. 3 showing additional processes, according to one embodiment. In operation 402, an interface to the operating system that may be substantially similar to the source operating system by utilizing DBT's operating system emulation services may be provided upon encountering code associated with the source platform object code (e.g., the source platform object code module 102 of FIG. 1)

In operation 404, kernel performance data may be dynamically obtained during the sampling run of the instrumented code (e.g., the instrumented code 110 of FIG. 1) by the DBT. In these embodiments, the operation 402 can also take place at operation 304 (shown in FIG. 3) as the run used to generate profile date can also be used to generate the kernel data.

In operation 406, target platform code (e.g., the target platform code module 106 of FIG. 1) may be generated by the DBT (e.g., the dynamic binary translator module 104A-B of FIG. 1) based on the dynamically obtained kernel performance data.

The above described technique basically generates the target platform code by first executing profile of the emulated code and then obtaining the flow data and the kernel performance data substantially simultaneously from the emulated code. Further, the feature of the code instrumenter, which instruments the translation, is included as a function of the DBT so that the profiling information for the target platform is generated similar to the source platform.

Also, the method may be in a form of a machine-readable medium embodying a set of instructions that, when executed by a machine, cause the machine to perform any method disclosed herein. It will be appreciated that the various embodiments discussed herein may not be the same embodiment, and may be grouped into various other embodiments not explicitly disclosed herein.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method for forming profiling information of one computer platform in another computer platform, comprising:
   generating instrumented code by a code instrumenter using target platform codes;
   generating the profile information that source platform profiling tools can decipher and utilize using the instrumented code;
   generating a profile report by analyzing the generated profile information using the source platform profiling tools in a dynamic binary translator (DBT) that can be used by the DBT to generate a first target platform code;
   analyzing kernel performance data during a sampling run of the instrumented code by the DBT; and
   generating a second target platform code by the DBT based on the obtained kernel performance data.

2. The method of claim 1, wherein the profile information comprises profile data and flow path data.

3. The method of claim 2, further comprising:
   translating source platform object code into the target platform codes using the DBT.

4. The method of claim 3, further comprising:
   generating the target platform codes as a function of the generated profile report to improve target platform codes performance.

5. The method of claim 1, further comprising:
   providing an interface to operating system that is substantially similar to a source operating system by utilizing DBTs' operating system emulation services upon encountering code associated with the source platform object code.

6. The method of claim 1, wherein the instrumented code comprises:
   inserting instrumentation into each set of instructions in the target platform codes that require generating profiling information similar to the source platform code.

7. An article comprising:
   a storage medium storing instructions, that when executed by a computing platform, result in execution of a method for replicating profiling information of one computing platform to another computing platform comprising:
   generating instrumented code by a code instrumenter using target platform codes;
   generating the profile information that source platform profiling tools can decipher and utilize using the instrumented code;
   generating a profile report by analyzing the generated profile information using the source platform profiling tools in a dynamic binary translator (DBT) that can be used by the DBT to generate a first target platform code;
   analyzing kernel performance data during a sampling run of the instrumented code by the DBT; and
   generating a second target platform code by the DBT based on the obtained kernel performance data.

8. The article of claim 7, wherein the profile information comprises profile data and flow path data.

9. The article of claim 8, further comprising:
   translating source platform object code into the target platform codes using the DBT.

10. The article of claim 9, further comprising:
    generating the target platform codes as a function of the generated profile report to improve target platform codes performance.

11. The article of claim 7, further comprising:
    providing an interface to operating system that is substantially similar to a source operating system by utilizing DBTs' operating system emulation services upon encountering code associated with the source platform object code.

12. The article of claim 7, wherein the instrumented code comprises:
    inserting instrumentation into each set of instructions in the target platform codes that require generating profiling information similar to the source platform code.

13. A computer system comprising:
    a processing unit; and
    a memory coupled to the processor, the memory having stored therein code for creating memory page classification, the code causes the processor to perform a method comprising:
    generating instrumented code by a code instrumenter using target platform codes;
    generating profile information that source platform profiling tools can decipher and utilize using the instrumented code;
    generating a profile report by analyzing the generated profile information using the source platform profiling tools in a dynamic binary translator (DBT) that can be used by the DBT to generate a first target platform code;
    analyzing kernel performance data during a sampling run of the instrumented code by the DBT; and
    generating a second target platform code by the DBT based on the obtained kernel performance data.

14. The system of claim 13, wherein the profile information comprises profile data and flow path data.

15. The system of claim 14, further comprising:
    translating source platform object code into the target platform codes using the DBT.

16. The system of claim 15, further comprising:
    generating the target platform codes as a function of the generated profile report to improve target platform codes performance.

17. The system of claim 13, further comprising:
    providing an interface to operating system that is substantially similar to a source operating system by utilizing DBTs' operating system emulation services upon encountering code associated with the source platform object code.

18. The system of claim 13, wherein the instrumented code comprises:
    inserting instrumentation into each set of instructions in the target platform codes that require generating profiling information similar to the source platform code.

* * * * *

UNITED STATES PATENT AND TRADEMARK OFFICE
CERTIFICATE OF CORRECTION

PATENT NO. : 8,141,066 B2
APPLICATION NO. : 12/000645
DATED : March 20, 2012
INVENTOR(S) : Arijit Chatterjee et al.

Page 1 of 1

It is certified that error appears in the above-identified patent and that said Letters Patent is hereby corrected as shown below:

Title page, Item (30), Foreign Application Priority data, in column 1, line 1, delete "79/2007" and insert -- 79/CHE/2007 --, therefor.

Signed and Sealed this
Twelfth Day of March, 2013

Teresa Stanek Rea
*Acting Director of the United States Patent and Trademark Office*